United States Patent
Ro (10) Patent No.: US 11,423,668 B2
(45) Date of Patent: Aug. 23, 2022

(54) VEHICLE AND CONTROL METHOD THEREOF

(71) Applicant: MANDO CORPORATION, Pyeongtaek-si (KR)

(72) Inventor: Dai Chang Ro, Seoul (KR)

(73) Assignee: Mando Mobility Solutions Corporation, Pyeongtaek-si (KR)

( * ) Notice: Subject to any disclaimer, the term of this patent is extended or adjusted under 35 U.S.C. 154(b) by 0 days.

(21) Appl. No.: 16/743,875

(22) Filed: Jan. 15, 2020

(65) Prior Publication Data

US 2020/0394426 A1 Dec. 17, 2020

(30) Foreign Application Priority Data

Jun. 11, 2019 (KR) .................. 10-2019-0068781

(51) Int. Cl.
| | |
|---|---|
| *B60R 11/04* | (2006.01) |
| *G06V 20/58* | (2022.01) |
| *G01C 21/36* | (2006.01) |
| *G08G 1/0967* | (2006.01) |
| *G05D 1/00* | (2006.01) |

(52) U.S. Cl.
CPC .......... *G06V 20/582* (2022.01); *B60R 11/04* (2013.01); *G01C 21/3602* (2013.01); *G05D 1/0094* (2013.01); *G08G 1/096725* (2013.01); *G08G 1/096783* (2013.01); *B60R 2300/302* (2013.01)

(58) Field of Classification Search
CPC ............... G06K 9/00818; B60R 11/04; G01C 21/3602; G05D 1/0094; G08G 1/096725
USPC ......................................................... 340/905
See application file for complete search history.

(56) References Cited

U.S. PATENT DOCUMENTS

| | | | |
|---|---|---|---|
| 10,900,804 B2* | 1/2021 | Zhang | G01C 21/3848 |
| 2015/0302747 A1* | 10/2015 | Ro | G08G 1/0967 340/905 |
| 2017/0154527 A1* | 6/2017 | Yoshitomi | G08G 1/096783 |
| 2017/0154528 A1* | 6/2017 | Moritani | G06K 9/00845 |
| 2017/0174132 A1* | 6/2017 | Yokochi | G06K 9/78 |
| 2017/0253239 A1* | 9/2017 | Satomura | B60W 50/14 |
| 2019/0234745 A1* | 8/2019 | Lee | G01C 21/30 |
| 2020/0019798 A1* | 1/2020 | Stenneth | G06K 9/00818 |
| 2020/0320875 A1* | 10/2020 | Lacaze | G05D 1/0293 |
| 2020/0394426 A1* | 12/2020 | Ro | G06K 9/00818 |

FOREIGN PATENT DOCUMENTS

KR 10-2019-0076195 A 7/2019

* cited by examiner

*Primary Examiner* — Kam Wan Ma
(74) *Attorney, Agent, or Firm* — Morgan, Lewis & Bockius LLP (57) ABSTRACT

Disclosed herein are a vehicle and a method of controlling a vehicle, and an object thereof is to provide a user with rapid and accurate recognition of traffic information around a road while a vehicle travels. To this end, the method of controlling a vehicle according to the present disclosure includes detecting a display content of a traffic sign located around a vehicle, and displaying a detection result of the traffic sign on a display unit in the vehicle before the vehicle passes the traffic sign.

13 Claims, 9 Drawing Sheets

(A) CONVENTIONAL TECHNOLOGY (B) PRESENT DISCLOSURE

VEHICLE AND CONTROL METHOD THEREOF

CROSS-REFERENCE TO RELATED APPLICATION

This application claims the benefit of Korean Patent Application No. 10-2019-0068781, filed on Jun. 11, 2019 in the Korean Intellectual Property Office, the disclosure of which is incorporated herein by reference.

BACKGROUND

1. Field

Embodiments of the present disclosure relate to a vehicle, and more particularly to control of a traffic information display of a vehicle.

2. Description of the Related Art

Displaying traffic information to a user (driver) in a car is very important to facilitate safe driving and convenience of the driver.

A typical traffic information display of an automobile can be exemplified such as displaying a regulated speed on map data in a navigation device to induce a driver to drive at a safe speed. However, in the case of a navigation device, a map and traffic information of the navigation device need to be updated to provide the latest traffic information. When an update period of the map and traffic information of the navigation device is delayed, a user may not be provided with the latest traffic information, which results in dissatisfaction of the user in terms of safe driving and convenience of the driver.

SUMMARY

Therefore, it is an aspect of the present disclosure to provide a driver with rapid and accurate recognition of traffic information around a road while a vehicle travels.

Additional aspects of the disclosure will be set forth in part in the description which follows and, in part, will be obvious from the description, or may be learned by practice of the disclosure.

In accordance with one aspect of the present disclosure, a method of controlling a vehicle includes detecting a display content of a traffic sign located around a vehicle, and displaying a detection result of the traffic sign on a display unit in the vehicle before the vehicle passes the traffic sign.

The detecting of the display content of the traffic sign may include determining validity of a detection result of the display content of the traffic sign.

When the detected traffic sign includes a single traffic sign at a single location while the vehicle travels on a straight lane, it may be determined that the detection result of the single traffic sign satisfies the validity.

When the detected traffic sign includes a plurality of traffic signs at a single location while the vehicle travels on a straight lane, it may be determined that the detection result of the traffic sign with a short transverse distance from the vehicle among the plurality of traffic signs satisfies the validity.

When the detected traffic sign includes a traffic sign on each road branching while the vehicle travels on a branch road, it may be determined that the detection result of the traffic sign located on a road in a traveling direction predicted based on traveling information of the vehicle satisfies the validity.

The traveling information of the vehicle for predicting the traveling direction of the vehicle may include at least one of steering angle information of a steering wheel of the vehicle and lighting information of a turn signal lamp of the vehicle.

The detection result may be displayed before the vehicle approaches a predetermined distance from the traffic sign in the traveling direction of the vehicle.

The method of controlling a vehicle may further include additionally detecting the display content of the traffic sign after the detection result is displayed.

The additional detection may include determining validity of the detection result of the display content of the traffic sign once again.

The traffic sign may be a speed sign, and the detection result of the traffic sign may be regulated speed information indicated on the speed sign.

In accordance with another aspect of the present disclosure, a vehicle includes a traffic information detector provided to detect a display content of a traffic sign located around a vehicle, and a controller configured to display a detection result of the traffic sign on a display unit in the vehicle before the vehicle passes the traffic sign.

The detection of the display content of the traffic sign may include determining validity of a detection result of the display content of the traffic sign.

When the detected traffic sign includes a single traffic sign at a single location while the vehicle travels on a straight lane, the controller may determine that the detection result of the single traffic sign satisfies the validity.

When the detected traffic sign includes a plurality of traffic signs at a single location while the vehicle travels on a straight lane, the controller may determine that the detection result of the traffic sign with a short transverse distance from the vehicle among the plurality of traffic signs satisfies the validity.

When the detected traffic sign includes a traffic sign on each road branching while the vehicle travels on a branch road, the controller may determine that the detection result of the traffic sign located on the road in a traveling direction predicted based on traveling information of the vehicle satisfies the validity.

The traveling information of the vehicle for predicting the traveling direction of the vehicle may include at least one of steering angle information of a steering wheel of the vehicle and lighting information of a turn signal lamp of the vehicle.

The controller may display the detection result before the vehicle approaches a predetermined distance from the traffic sign in the traveling direction of the vehicle.

The controller may additionally detect the display content of the traffic sign after the detection result is displayed.

The additional detection may include determining validity of the detection result of the display content of the traffic sign once again.

The traffic sign may be a speed sign, and the detection result of the traffic sign may be regulated speed information indicated on the speed sign.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
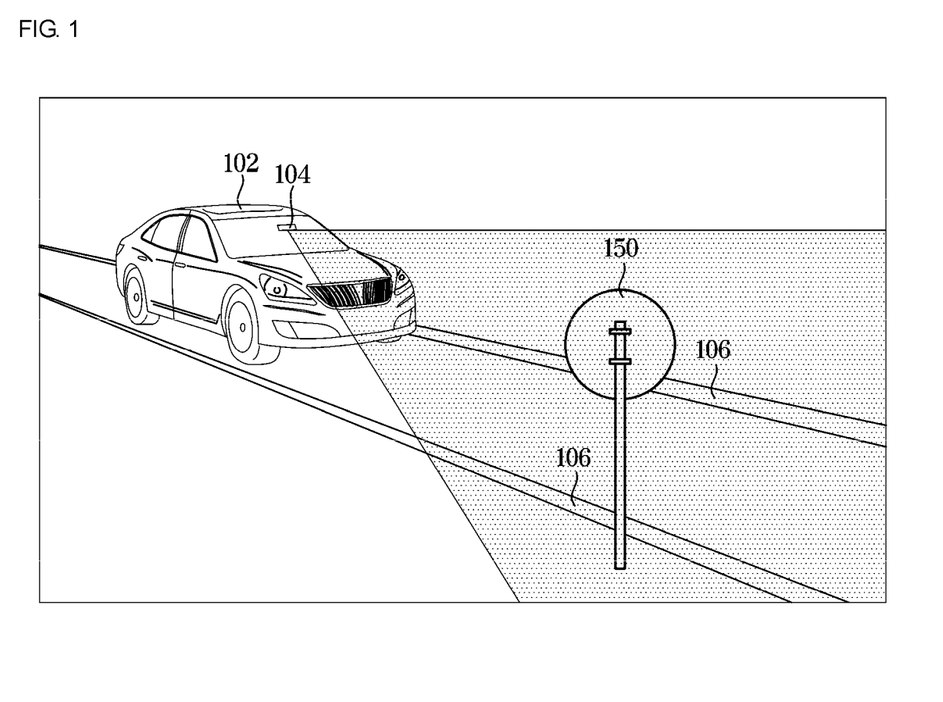
FIG. 1 is a view illustrating a traveling state of a vehicle in accordance with one embodiment of the present disclosure.

FIG. 1 is a view illustrating a traveling state of a vehicle in accordance with one embodiment of the present disclosure. As illustrated in FIG. 1, a vehicle 102 in accordance with the embodiment of the present disclosure is provided with a front camera 104 which can capture surrounding images. This front camera 104 is one element constituting a traffic information detector 402 (see FIG. 4) to be described below. An image captured by the front camera 104 is used for recognition of a lane 106 displayed on a road and is also used for recognition of traffic information (for example, a regulated speed and the like) displayed on various traffic signs 150 located around the vehicle 102.

Figure 2:
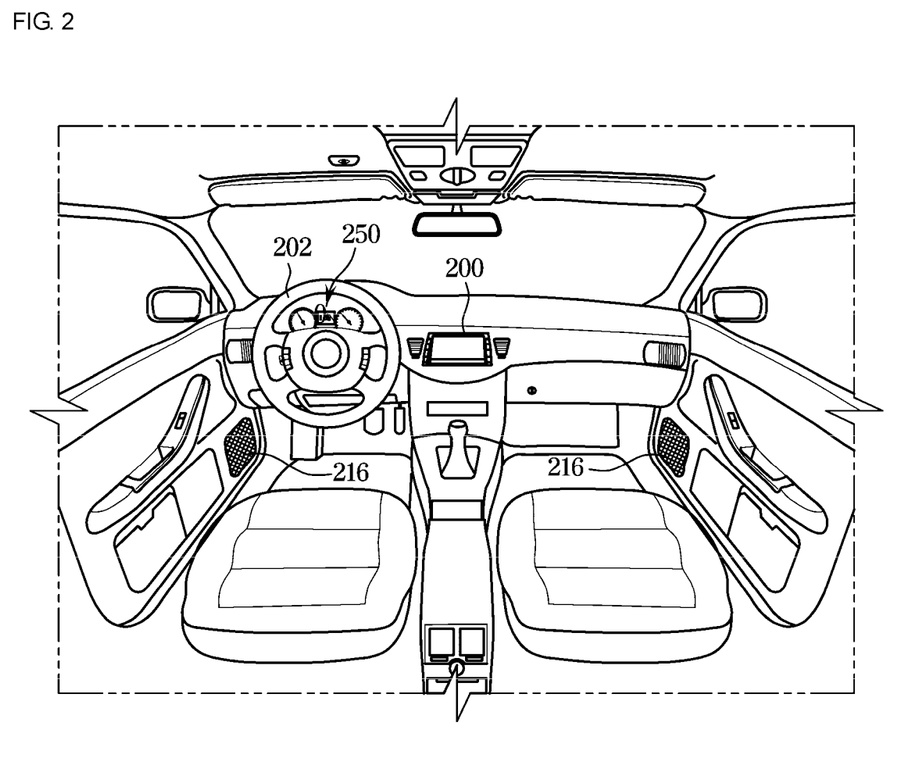
FIG. 2 is a view illustrating an interior of a vehicle in accordance with one embodiment of the present disclosure.

FIG. 2 is a view illustrating the interior of the vehicle in accordance with the embodiment of the present disclosure. As illustrated in FIG. 2. A navigation device 200 and a steering wheel 232 are mounted in front of a driver's seat. The navigation device 200 includes audio, video, and navigation devices, which are integrated, and also includes a display. A speaker 116 is mounted on a left door of the driver's seat and a right door of a passenger seat. A cluster 250 is provided beyond a steering wheel 202. The cluster 250 displays various types of traveling state information of the vehicle 102.

Figure 3:
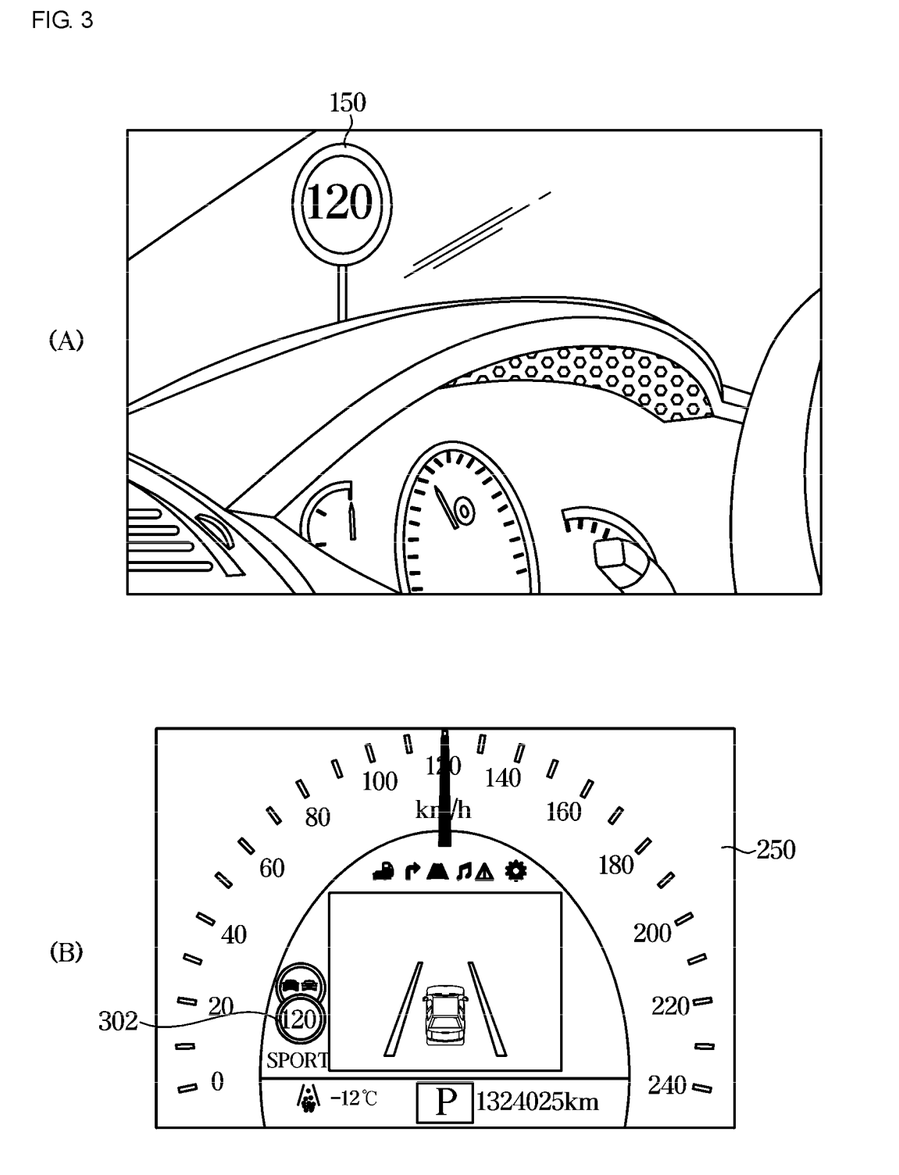
FIG. 3 is a view illustrating a regulated speed display using traffic sign recognition of a vehicle in accordance with one embodiment of the present disclosure.

FIG. 3 is a view illustrating a regulated speed display using traffic signal recognition of the vehicle in accordance with the embodiment of the present disclosure. As illustrated in FIG. 3A, a traffic information detector 402 of the vehicle 102 recognizes a regulated speed (120 km/h or lower in FIG. 3) from the traffic sign 150 located outside the vehicle 102. The regulated speed recognized by the traffic information detector 402 is displayed on the cluster 250 as "a regulated speed 302 recognized by the traffic information detector" as illustrated in FIG. 3B. As will be described in detail with reference to FIG. 4, a regulated speed display of the cluster 250 may or may not be displayed according to settings of a driver.

Figure 4:
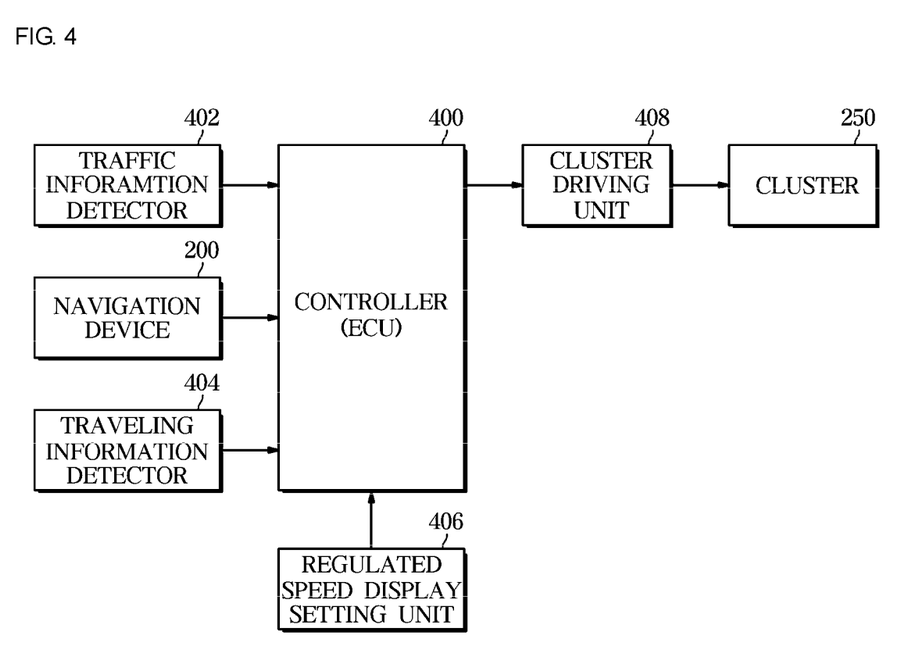
FIG. 4 is a view illustrating a control system of a vehicle in accordance with one embodiment of the present disclosure.

FIG. 4 is a view illustrating a control system of a vehicle in accordance with an embodiment of the present disclosure. The traffic information detector 402, the navigation device 200, a traveling information detector 404, and a regulated speed display setting unit 406 are communicatively connected to an input of a controller 400, and the cluster 250 is communicatively connected to an output of the controller 400 through a cluster driving unit 408.

The traffic information detector 402, which has been briefly described in the description in FIG. 1, will be described in detail as follows. The traffic information detector 402 captures surrounding images of the vehicle 102, and acquires various types of traffic information on a road (for example, information through recognition of the lane 106 and the traffic sign 150) by analyzing the captured images.

The recognition of the lane 106 is performed to generate an alarm when the vehicle 102 leaves a lane while traveling or to automatically control a direction of the vehicle 102 such that the vehicle 102 does not leave the lane when the vehicle 102 attempts to do so.

In addition, the recognition of the traffic sign 150 is performed to acquire various types of traffic information on a road on which the vehicle 102 travels. For example, the traffic sign 150 may be a regulated speed sign for displaying a maximum regulated speed. An information processor 504 reads a regulated speed indicated on the traffic sign through an analysis of a captured image of the traffic sign 150, and provides the regulated speed to the controller 400.

The navigation device 200 includes audio, video, and navigation devices, which are integrated, and a regulated speed on map data of the navigation device is basically indicated on a display of the navigation device 200 in a navigation device mode. Moreover, traffic information (for example, a regulated speed) detected by the traffic information detector 402 in a specific situation may be displayed on the display of the navigation device 200 under control of the controller 400.

The traveling information detector 404 detects current traveling information of the vehicle 102 and transmits the current traveling information to the controller 400.

The regulated speed display setting unit 406 is made to set a regulated speed to be or to not be displayed on the cluster 250. For this purpose, the regulated speed display setting unit 406 may be embodied in the form of a graphic user interface on the display of the navigation device 200.

The cluster 250 may display various types of traveling state information of the vehicle 102. For example, a traveling speed and an engine rotation speed (revolution per minute (RPM)) of the vehicle 102, a lane detection result, traffic information, and the like may be displayed on the cluster 250. In particular, an actual regulated speed on a traffic sign acquired by the traffic information detector 402 may be selectively displayed on the cluster 250.

The controller (electronic control unit (ECU)) 400 controls an overall operation of the vehicle 102.

Figure 5:
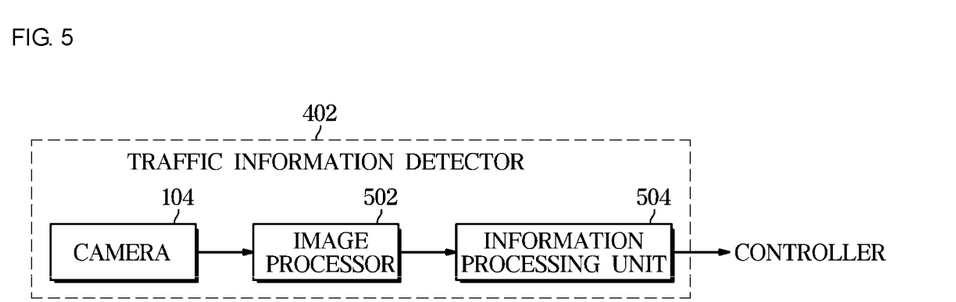
FIG. 5 is a view illustrating a configuration of a traffic information detector shown in FIG. 4.

FIG. 5 is a view illustrating a configuration of the traffic information detector illustrated in FIG. 4. As illustrated in FIG. 5, the traffic information detector 402 in accordance with the embodiment of the present disclosure includes a front camera 104, an image processor 502, and an information processor 504.

The front camera 104 captures surrounding images of the vehicle 102. For example, the lane 106, the traffic sign 105, or the like located around the vehicle 102 may be captured using the front camera 104.

The image processor 502 converts an analog image signal generated by image-capturing of the front camera 104 into a digital image signal. Moreover, the image processor 502 performs a correction operation for improving image quality.

The information processor 504 detects the lane 106 in front of the vehicle 102 from the images acquired through the image-capturing of the front camera 104 (see FIG. 1). The information processor 504 also reads a display content of the traffic sign 150 in front of the vehicle 102 (see FIG. 1) from the image acquired through the image-capturing of the front camera 104. For example, the traffic sign 150 may be a regulated speed sign for indicating a maximum regulated speed. The information processor 504 reads a regulated speed indicated on a traffic sign through an analysis of a captured image of the traffic sign 150, and provides the regulated speed to the controller 400.

Figure 6:
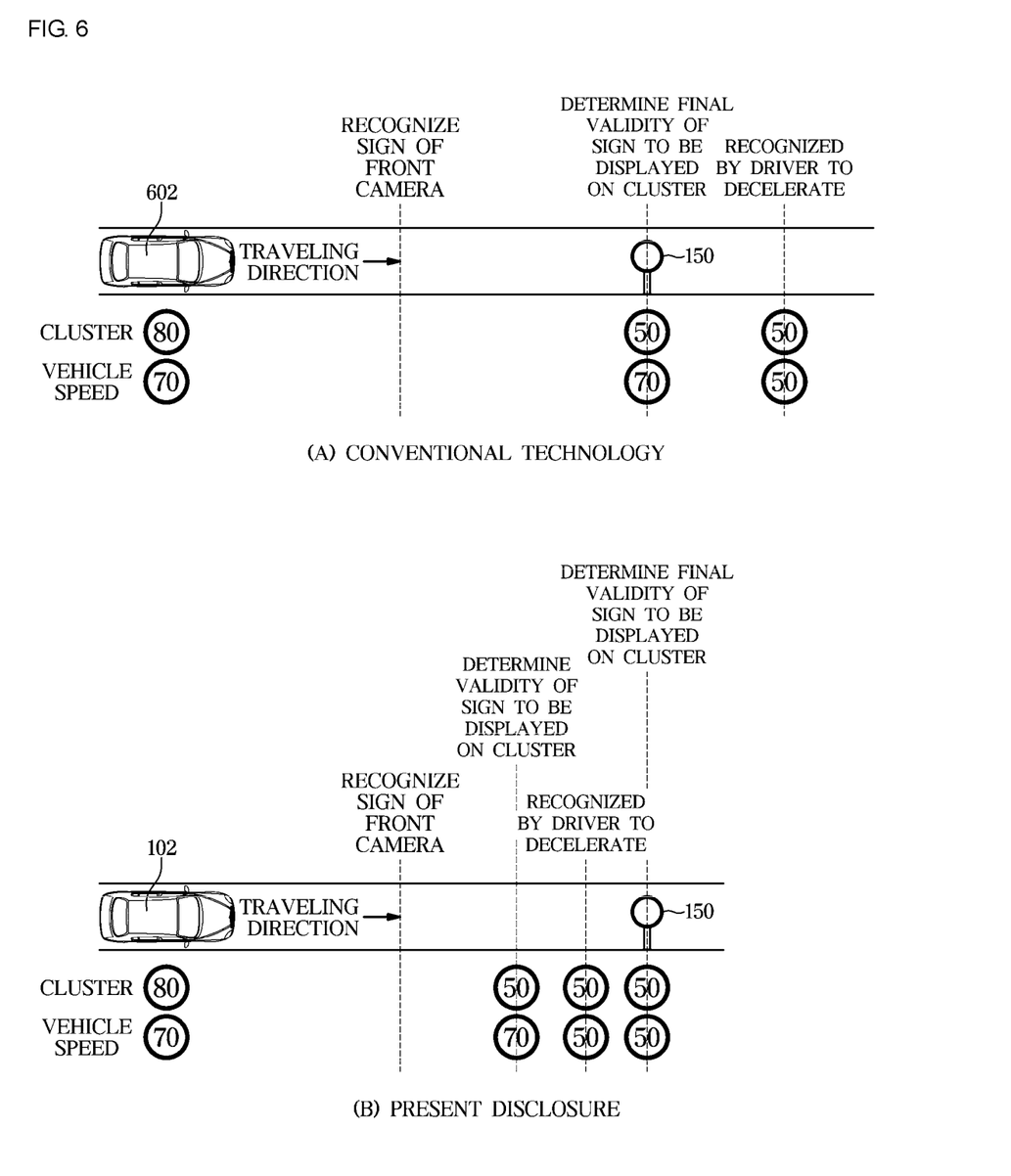
FIG. 6 is a view illustrating a traffic sign validity determination and a driver's recognition time of a vehicle in accordance with one embodiment of the present disclosure.

FIG. 6 is a view illustrating a traffic sign validity determination and a driver's recognition time of a vehicle in accordance with one embodiment of the present disclosure. FIG. 6A is a view illustrating the speed sign validity determination and the driver's recognition time of a conventional vehicle. FIG. 6B is a view illustrating the speed sign validity determination and the driver's recognition time of a vehicle in accordance with an embodiment of the present disclosure.

Validity of a traffic sign (speed sign) is a measure indicating reliability of a detection content of the traffic sign (speed sign) detected by the controller 400 of the vehicle 102 through the traffic information detector 402. When the validity of the traffic sign (speed sign) is greater than or equal to a predetermined value, it means that a corresponding detection result of the traffic sign (speed sign) is sufficiently reliable. On the other hand, when the validity of the traffic sign (speed sign) is less than the predetermined value, it means that a corresponding detection result of the traffic sign (speed sign) cannot be ensured to be reliable.

First, in the case of a conventional technology illustrated in FIG. 6A, a driver recognizes a regulated speed and performs deceleration only after a traffic sign (for example, a speed sign) 150 is recognized using a front camera of an existing vehicle 602, and is indicated on a cluster (or a display) through a determination of final validity of the traffic sign 150.

On the other hand, in the case of the embodiment of the present disclosure illustrated in FIG. 6B, the traffic sign 150 is recognized using the front camera 104 of the vehicle 102 and is indicated on the cluster 250 through a determination of the validity of the traffic sign 150 (a primary validity determination), and thereby a driver can recognize a regulated speed faster. Thereafter, regulated speed information indicated on the cluster 250 is updated through determination of the final validity of the traffic sign 150 (secondary validity determination).

As shown in FIG. 6, a validity determination time of the traffic sign 150 is delayed and the driver recognizes the regulated speed only after the existing vehicle 602 passes the traffic sign 150 in the conventional technology. However, a regulated speed recognition time of the driver may be advanced by bringing the validity determination time of the traffic sign 150 significantly forward in the embodiment of the present disclosure. Accordingly, the driver may recognize the regulated speed before the vehicle 102 passes the traffic sign 150, and perform deceleration of the vehicle 102.

Figure 7:
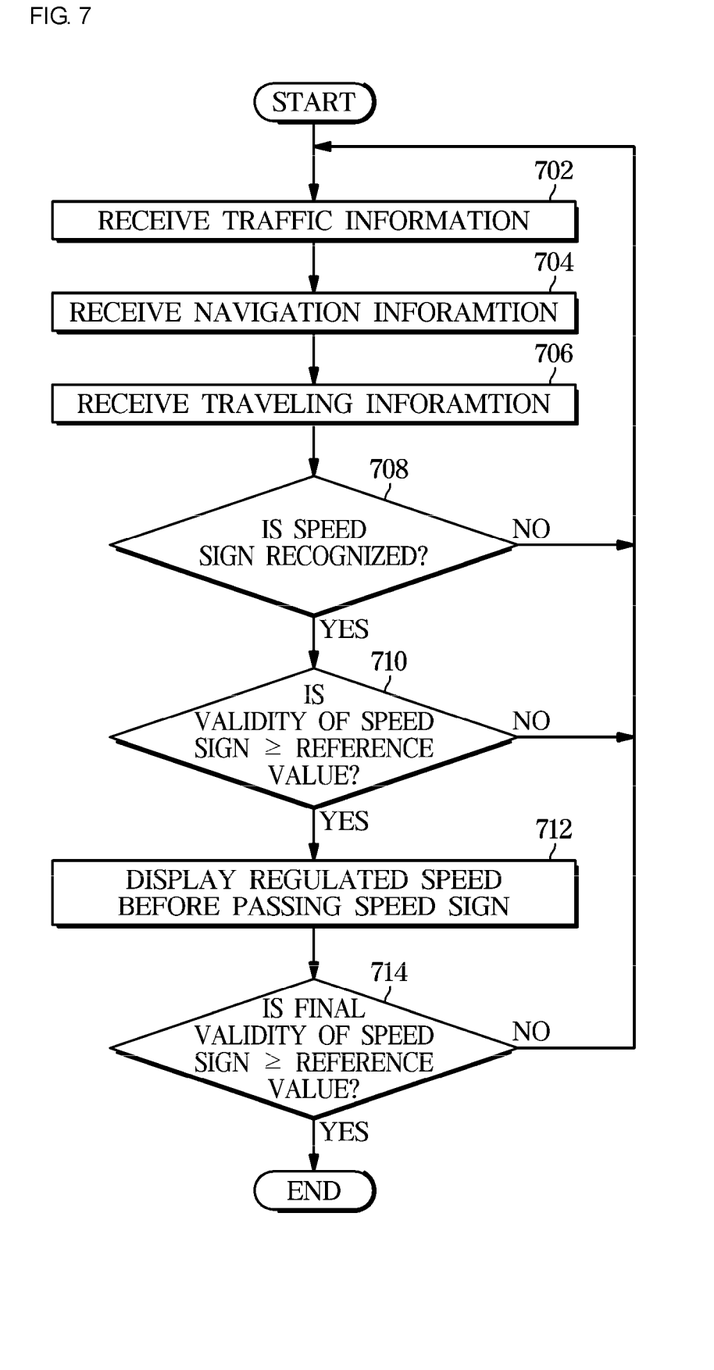
FIG. 7 is a view illustrating a method of controlling a vehicle in accordance with one embodiment of the present disclosure.

FIG. 7 is a view illustrating a method of controlling a vehicle in accordance with one embodiment of the present disclosure.

The controller 500 of the vehicle 102 receives traffic information from the traffic information detector 402 (702). The traffic information may include, for example, information regarding the lane 106 captured by the front camera 104, and traffic information (for example, a regulated speed, and the like) indicated on the traffic sign 150 located around the vehicle 102.

In addition, the controller 400 receives navigation information from the navigation device 200 (704). The information received from the navigation device 200 may include global positioning system (GPS) information (location information).

Moreover, the controller 400 receives traveling-related information of the vehicle 102 from the traveling information detector 404 (706). The traveling-related information of the vehicle 102 may include a traveling speed and an engine rotation speed (RPM) of the vehicle 102, a lane detection result, and the like.

During traveling of the vehicle 102 while receiving such information, when the traffic sign (specifically, speed sign) 150 located on a road side is recognized (Yes in 708), the controller 400 determines validity of the speed sign as an index indicating reliability of a detection result of the speed sign 150 (710) (primary validity determination). The validity determination of the speed sign 150 will be described in detail with reference to FIGS. 8 to 9 to be described below.

When it is determined that the validity of a speed is greater than or equal to a predetermined reference value (Yes in 710), the controller 400 displays the regulated speed of a detected speed sign 150 on the cluster 250 such that a driver can recognize the regulated speed of the speed sign 150 located at a far distance in front of the vehicle 102 in advance (712). In this case, it is preferable that the controller 400 indicates the regulated speed of the speed sign 150 on the cluster 250 as soon as possible after detecting the speed sign 150 before the vehicle 102 passes the speed sign 150. As a result, the driver may take time to decelerate a speed of the vehicle 102 to the regulated speed while approaching the speed sign 150.

Thereafter, the controller 400 determines the validity of the recognized speed sign 150 once again (secondary validity determination) (714). That is, the controller 400 determines once again whether the final validity of the speed sign 150 exceeds the predetermined reference value. When the final validity of the speed sign 150 is greater than or equal to the predetermined value (Yes in 714), the controller 400 stops displaying the regulated speed based on the speed sign recognition or returns to a traffic information reception step (702) to repeat processes of operations 702 to 714.

Figure 8:
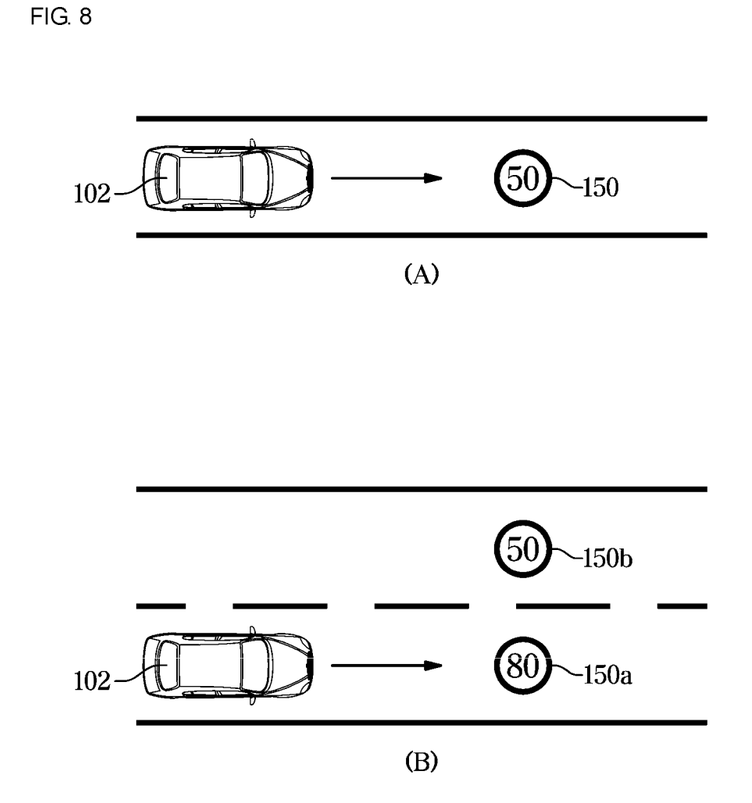
FIG. 8 is a view illustrating a first embodiment of a validity determination of a speed sign in accordance with one embodiment of the present disclosure.

FIG. 8 is a view illustrating a first embodiment of the validity determination of a speed sign in accordance with one embodiment of the present disclosure. The validity determination of a speed sign illustrated in FIG. 8 is a case on a condition in which the vehicle 102 travels on a straight road in a single direction.

As illustrated in FIG. 8A, a travel route is unlikely to change when the vehicle 102 travels on the straight road in the single direction. In addition, when there is only a single speed sign 150 at a single location of a lane on which the vehicle 102 travels, the controller 400 detects only this single speed sign 150 and recognizes a regulated speed. That is, presence of only one speed sign 150 at a certain location means that there are no other speed signs which may cause confusion, a detection and a regulated speed recognition result of the speed sign 150 are sufficiently reliable (high validity). In this case, the controller 400 displays a regulated speed "50 km/h" on the cluster 250 at a predetermined distance (for example, 40 meters) in front of the speed sign 150 in advance such that a driver can recognize the regulated speed.

In the case of FIG. 8B, the vehicle 102 also travels on the straight road in the single direction as in FIG. 8A. However, there are a plurality of speed signs 150a and 150b; one sign on a traveling lane and the other sign on an immediately adjacent lane in the case of FIG. 8B. In such a case, it is preferable to select a sign of "80" which is the speed sign 150a of the lane on which the vehicle 102 is traveling among the plurality of speed signs 150a and 150b. To this end, the controller 400 recognizes the regulated speed (80 km/h) of the speed sign 150a with the shortest transverse distance in front of the vehicle 102. Here, a transverse direction is a direction orthogonal to the traveling direction of the vehicle 102 when the traveling direction of the vehicle 102 is set to a longitudinal direction. Since the 80 km/h speed sign 150a has a relatively shorter transverse distance than the 50 km/h speed sign 150b, the detection and the regulated speed recognition result of the 80 km/h speed sign 150a is sufficiently reliable (high validity). In particular, when the 80 km/h speed sign 150a is consecutively detected while the vehicle 102 travels over a certain distance (for example, 100 meters or more), the validity of the 80 km/h speed sign 150a may increase. In this case, the controller 400 displays the regulated speed of "80 km/h" on the cluster 250 at a predetermined distance (for example, 50 meters) in front of the 80 km/h speed sign 150 such that a driver can recognize the regulated speed.

Figure 9:
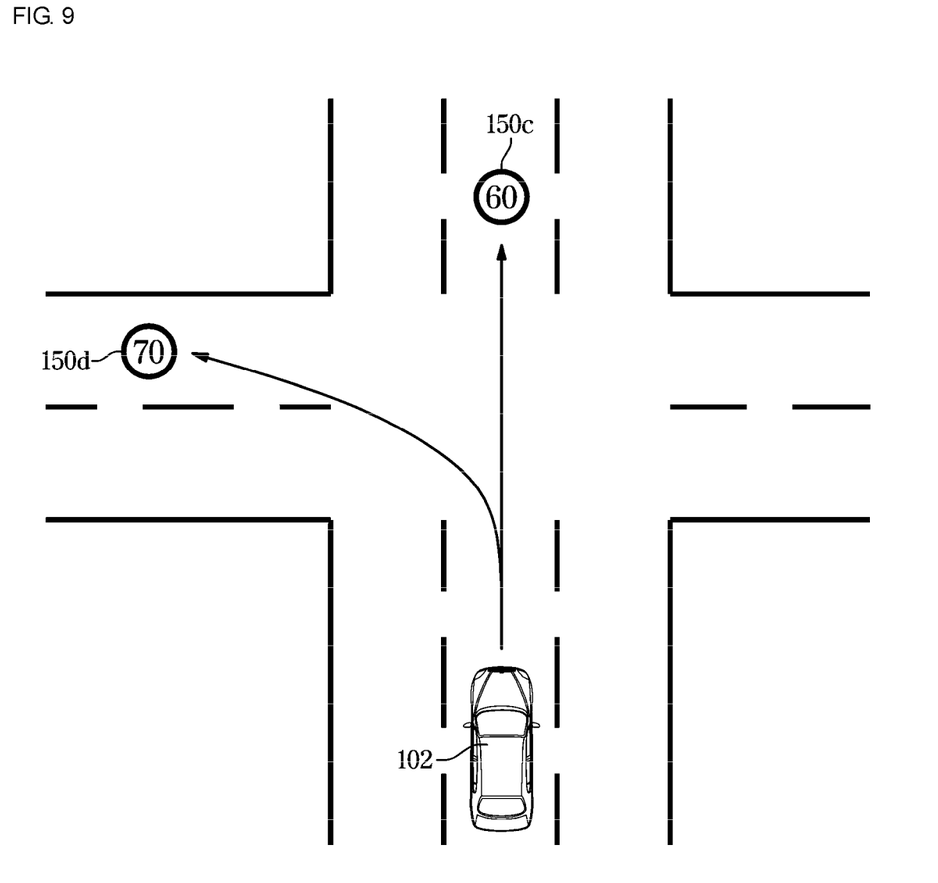
FIG. 9 is a view illustrating a second embodiment of the validity determination of a speed sign in accordance with one embodiment of the present disclosure.

FIG. 9 is a view illustrating a second embodiment of the validity determination of a speed sign in accordance with one embodiment of the present disclosure. The validity determination of a speed sign illustrated in FIG. 9 is a case on a condition in which the vehicle 102 travels on an intersection section. The intersection is an example of a branch road, and the validity can be determined in any road to which a lane is branched in the same manner as in FIG. 9.

As illustrated in FIG. 9, the vehicle 102 needs to select one of a speed sign 150c located on a straight lane and a speed sign 150d located on a left-turn (or a right-turn) lane when the vehicle passes the intersection.

For example, when the vehicle 102 goes straight on a central lane, the controller 400 ignores the speed sign 150d located on the left-turn lane and recognizes a regulated speed of the speed sign 150c located on the straight lane to display the recognized regulated speed on the cluster 250. When the vehicle 102 goes straight at the intersection as illustrated in FIG. 9, it is assumed that the speed sign 150d located on the left-turn (or right-turn) lane has validity actually close to zero. Therefore, in this case, it is preferable to select the speed sign 150c on the straight lane having relatively high validity and to recognize the regulated speed thereof. Whether the vehicle 102 goes straight can be ascertained through steering angle information of the steering wheel 202 detected by the traveling information detector 404 of the vehicle 102 or a lighting state of a turn signal lamp (not shown).

When the vehicle 102 intends to turn left on the central land, the controller 400 ignores the speed sign 150c located on the straight lane and recognizes a regulated speed of the speed sign 150d located on the left-turn lane to display the recognized regulated speed on the cluster 250. When the vehicle 102 turns left at the intersection as illustrated in FIG. 9, it is assumed that the speed sign 150c located on the straight lane has validity actually close to zero. Therefore, in this case, it is preferable to select the speed sign 150d on the left-turn lane having relatively high validity and to recognize the regulated speed thereof. Whether the vehicle 102 turns left (or turns right) can be ascertained through the steering angle information of the steering wheel 202 detected by the traveling information detector 404 of the vehicle 102 or the lighting state of a turn signal lamp (not shown).

When the vehicle 102 travels on an innermost lane rather than the central lane, or travels on an outermost lane, it is preferable to determine a predicted traveling direction through the steering angle information of the steering wheel 202 and the lighting state of a turn signal lamp (not shown) with a left-turn or a right-turn in mind.

As is apparent from the above description, traffic information around a road while a vehicle travels is rapidly and accurately recognized and provided to a user, and thereby a user can cope with changes in traffic information.

The above description is merely illustrative description of the technical concept, and it would be appreciated by those skilled in the art that various modifications, changes, and substitutions can be made within a range not departing from the essential characteristics of the present disclosure. Therefore, the embodiments and accompanying drawings described above are not intended to limit the technical concept, and the scope of the technical concept is not limited by these embodiments and accompanying drawings. The scope of which is to be understood in accordance with the following claims, and all technical concepts within the scope of equivalents should be understood to fall within the scope of claims of the present disclosure.

What is claimed is:

1. A method of controlling a vehicle, comprising:
capturing an image of a traffic sign having a speed limit located around a vehicle;
determining, based on the image, whether validity of a number on the traffic sign is greater than or equal to a predetermined value;
in response to a determination that the validity is greater than or equal to the predetermined value and before the vehicle passes the traffic sign, displaying the number indicating the speed limit on a display unit in the vehicle;
after the number indicating the speed limit is displayed, additionally capturing the image of the traffic sign having the speed limit and determining, based on the additionally captured image, whether current validity indicating reliability of the number on the traffic sign is still greater than or equal to the predetermined value; and
in response to a determination that the current validity is greater than or equal to the predetermined value, stopping displaying the number indicating the speed limit on the display unit in the vehicle.

2. The method of controlling a vehicle according to claim 1, wherein, when the traffic sign includes a single traffic sign at a single location while the vehicle travels on a straight lane, it is determined that a detection result of the number of the single traffic sign satisfies the validity.

3. The method of controlling a vehicle according to claim 1, wherein, when the traffic sign includes a plurality of traffic signs at a single location while the vehicle travels on a straight lane, it is determined that a detection result of a traffic sign with a short transverse distance from the vehicle among the plurality of traffic signs satisfies the validity.

4. The method of controlling a vehicle according to claim 1, wherein, when the traffic sign includes a traffic sign on each road branching while the vehicle travels on a branch road, it is determined that a detection result of the traffic sign located on the road in a traveling direction predicted based on traveling information of the vehicle satisfies the validity.

5. The method of controlling a vehicle according to claim 4, wherein the traveling information of the vehicle for predicting the traveling direction of the vehicle includes at least one of steering angle information of a steering wheel of the vehicle and lighting information of a turn signal lamp of the vehicle.

6. The method of controlling a vehicle according to claim 1, wherein the number indicating the speed limit is displayed before the vehicle approaches a predetermined distance from the traffic sign in the traveling direction of the vehicle.

7. A control system for a vehicle, the control system comprising:
a traffic information detector configured to capture an image of a traffic sign having a speed limit located around a vehicle; and
a controller configured to:
determine, based on the image, whether validity of a number on the traffic sign is greater than or equal to a predetermined value;
in response to a determination that the validity is greater than or equal to the predetermined value and before the vehicle passes the traffic sign, display the number indicating the speed limit on a display unit in the vehicle;
after the number indicating the speed limit is displayed, determine, based on an additionally captured image, whether current validity indicating reliability of the number on the traffic sign is still greater than or equal to the predetermined value; and
in response to a determination that the current validity is greater than or equal to the predetermined value, stop displaying the number indicating the speed limit on the display unit in the vehicle.

8. The control system according to claim 7, wherein, when the traffic sign includes a single traffic sign at a single location while the vehicle travels on a straight lane, the controller determines that a detection result of the single traffic sign satisfies the validity.

9. The control system according to claim 7, wherein, when the traffic sign includes a plurality of traffic signs at a single location while the vehicle travels on a straight lane, the controller determines that a detection result of a traffic sign with a short transverse distance from the vehicle among the plurality of traffic signs satisfies the validity.

10. The control system according to claim 7, wherein, when the traffic sign includes a traffic sign on each road branching while the vehicle travels on a branch road, the controller determines that a detection result of the traffic sign located on the road in a traveling direction predicted based on traveling information of the vehicle satisfies the validity.

11. The control system according to claim 10, wherein the traveling information of the vehicle for predicting the traveling direction of the vehicle includes at least one of steering angle information of a steering wheel of the vehicle and lighting information of a turn signal lamp of the vehicle.

12. The control system according to claim 7, wherein the controller displays the number indicating the speed limit before the vehicle approaches a predetermined distance from the traffic sign in the traveling direction of the vehicle.

13. A vehicle comprising the control system according to claim 7.

* * * * *